United States Patent
Endo et al.

(10) Patent No.: US 7,633,780 B2
(45) Date of Patent: Dec. 15, 2009

(54) SWITCHING POWER SUPPLY APPARATUS WITH LOW LOSS SYNCHRONOUS RECTIFICATION

(75) Inventors: Naoto Endo, Chofu (JP); Koji Edamura, Tama (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 239 days.

(21) Appl. No.: 11/700,498

(22) Filed: Jan. 31, 2007

(65) Prior Publication Data

US 2007/0201253 A1    Aug. 30, 2007

(30) Foreign Application Priority Data

Feb. 28, 2006    (JP)    ............... 2006-052388

(51) Int. Cl.
    *H02M 7/217*    (2006.01)
(52) U.S. Cl. ......................................... 363/89; 363/127
(58) Field of Classification Search .................... 363/84, 363/89, 127
    See application file for complete search history.

(56) References Cited

U.S. PATENT DOCUMENTS

| | | | | |
|---|---|---|---|---|
| 4,922,404 A | * | 5/1990 | Ludwig et al. | ................. 363/89 |
| 6,128,206 A | * | 10/2000 | Sun et al. | ..................... 363/127 |
| 7,113,413 B1 | * | 9/2006 | Khasiev | .................... 363/21.14 |
| 7,120,036 B2 | * | 10/2006 | Kyono | ...................... 363/21.06 |
| 7,440,298 B2 | * | 10/2008 | Yang | ............................ 363/89 |
| 2001/0002171 A1 | * | 5/2001 | Abdoulin | ...................... 363/89 |
| 2002/0141209 A1 | * | 10/2002 | Bridge | ......................... 363/89 |
| 2005/0135127 A1 | * | 6/2005 | Hamilton | ..................... 363/89 |
| 2006/0018135 A1 | | 1/2006 | Yang et al. | |

FOREIGN PATENT DOCUMENTS

JP    2001-292571 A    10/2001

* cited by examiner

*Primary Examiner*—Jeffrey L Sterrett
(74) *Attorney, Agent, or Firm*—Frishauf, Holtz, Goodman, Chick, P.C.

(57) ABSTRACT

Disclosed is a synchronous rectification type switching power supply apparatus, including: a transformer that receives input voltage on a primary side; a switching element that is to be turned on or off for rectifying current of a secondary coil of the transformer; a control circuit to drive the switching element. The control circuit includes a first timing detection circuit to detect first timing at which forward current flows through a body diode of the switching element, and a second timing detection circuit to detect second timing with counter electromotive voltage that is generated at an instant when the body diode is turned off. The control unit is to generate an on/off control signal for the switching element to turn on the switching element at the first timing, to turn off the switching element before the second timing and to bring off-timing of the switching element close to the second timing.

6 Claims, 5 Drawing Sheets

SWITCHING POWER SUPPLY APPARATUS WITH LOW LOSS SYNCHRONOUS RECTIFICATION

BACKGROUND OF THE INVENTION

1. Field of the Invention

The present invention relates to a power supply apparatus which generates DC power supply voltage, and to an insulation DC converter using a transformer, and more particularly, to a synchronous rectification type switching power supply apparatus which carries out rectification on a secondary side by synchronous rectification control.

2. Description of the Related Art

As a circuit which converts input voltage using a transformer and outputs DC voltage of different potential, there is an insulation DC converter as shown in FIG. 7. This converter is called a half bridge type converter. The converter uses diodes D1 and D2 for rectifying current flowing from a secondary coil, and alternately charging a smoothing capacitor Co with current rectified by the diodes, thereby producing DC voltage. A circuit structure of such a diode bridge type rectifier circuit is simple, but there is a problem that rectification loss Vf·I is generated by forward voltage Vf of the diodes and current I flowing through the diodes.

Hence, as shown in FIG. 8, there is proposed an invention concerning a synchronous rectification type DC converter in which the diodes are replaced by MOSFET SW1 and SW2 having small on resistance, the MOSFET is on/off controlled by synchronous control to carry out the rectification (e.g., Japanese Patent Application Laid-open Publication No. 2001-292571).

In the synchronous rectification type converter described in the above-mentioned Japanese Patent Application Laid-open Publication No. 2001-292571, a sense resistor Rs is connected to switching MOSFET SW1 and SW2 in series, on/off timing of the SW1 and SW2 is detected by voltage reduction of the resistor, thereby generating a control signal. Therefore, the losses at the MOSFET SW1 and SW2 are small, but a loss is generated by the sense resistor Rs. In order to reduce this loss to a negligible value, it is necessary to reduce the resistance value, but there is a problem that if the resistance is reduced, voltage drop becomes small, and therefore, a precise and complicated detection circuit (comparator) is required.

To reduce the loss, the present inventors have invented a method for producing on/off control signals of SW1 and SW2 by detecting voltage between source and drain of the switching MOSFET SW1 and SW2 instead of connecting the sense resistor Rs. According to this method, however, there is a problem that since the voltage reduction caused by resistance component (usually a few mΩ) of the MOSFET having only on resistance having negligible loss is extremely small, there is a problem that a precise and stable detection circuit (comparator) having small variation is required.

SUMMARY OF THE INVENTION

The invention has been accomplished in view of such problems, and it is a major object of the present invention to provide a power supply apparatus having small loss capable of producing an on/off control signal for a switching element constituting a synchronous rectification circuit with a precise and stable circuit having small variation.

According to a preferable aspect of the present invention, there is provided a synchronous rectification type switching power supply apparatus, comprising:

a transformer to receive input voltage on a primary side;

a switching element that is to be turned on or off for rectifying current of a secondary coil of the transformer;

a control circuit to drive the switching element, the control circuit including a first timing detection circuit to detect first timing at which forward current flows through a body diode of the switching element, and a second timing detection circuit to detect second timing with counter electromotive voltage that is generated at an instant when the body diode is turned off, wherein the control unit is to generate an on/off control signal for the switching element to turn on the switching element at the first timing, to turn off the switching element before the second timing and to bring off-timing of the switching element close to the second timing.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS

Figure 1:
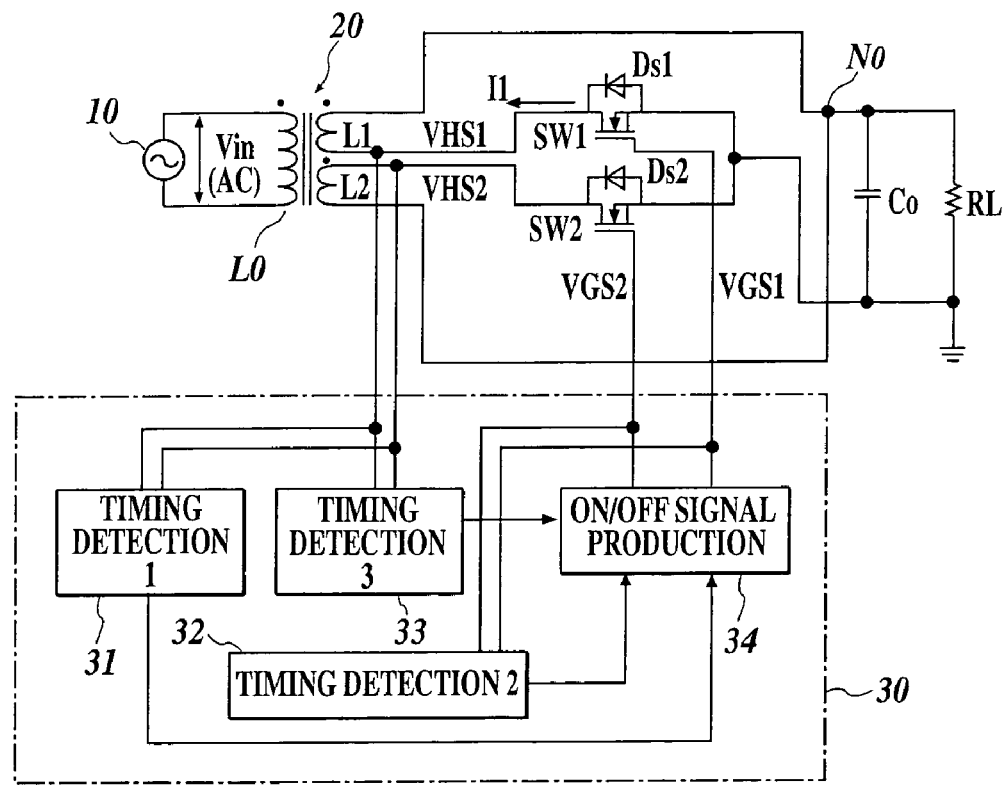
FIG. 1 is a block diagram showing one embodiment of a synchronous rectification type DC converter to which the invention is applied.

A preferred embodiment of the present invention will be explained referring to the drawings.

FIG. 1 shows an embodiment of a synchronous rectification type DC converter to which the invention is applied.

A DC converter of the embodiment is not especially limited, but the DC converter includes a transformer 20 in which AC voltage Vin (AC) from an AC power supply 10 is input to a primary coil L0. The transformer 20 includes two secondary coils L1 and L2. One terminals of the secondary coils L1 and L2 are connected to the ground through switching MOSFET SW1 and SW2, respectively. The other terminals of the secondary coils L1 and L2 are connected to a common node N0, and a smoothing capacitor Co is connected between the common node N0 and the ground. Here, a symbol RL connected to the capacitor Co in parallel represents a load in a form of equivalent resistance.

The DC converter of the embodiment includes a first timing detection circuit 31 which monitors drain side voltages VHS1 and VHS2 of the switching MOSFET SW1 and SW2 and which detects timing at which forward current starts flowing to body diodes Ds1 and Ds2 which are parasitic diodes between the source and drain of the SW1 and SW2, a second timing detection circuit 32 which detects timing at which gate voltages of the switching MOSFET SW1 and SW2 fall, a third timing detection circuit 33 which detects timing at which counter electromotive voltage generated by a secondary magnet flux and a leakage flux of the transformer at the instant when the body diodes Ds1 and Ds2 are turned OFF, and an on/off signal producing circuit 34 which produces on/off control signals (gate voltage) VGS1 and VGS2 applied to gate terminals of the switching MOSFET SW1 and SW2 based on a detection signal from the detection circuit.

The control circuit 30 and the switching MOSFET SW1 and SW2 constitute a synchronous rectification circuit. The switching MOSFET SW1 and SW2 are controlled such that they are turned on by the on/off signal producing circuit 34 during a phase period during which the phase is different by 180°, and the switching MOSFET SW1 and SW2 alternately flow charging current to the smoothing capacitor Co.

Figure 2:
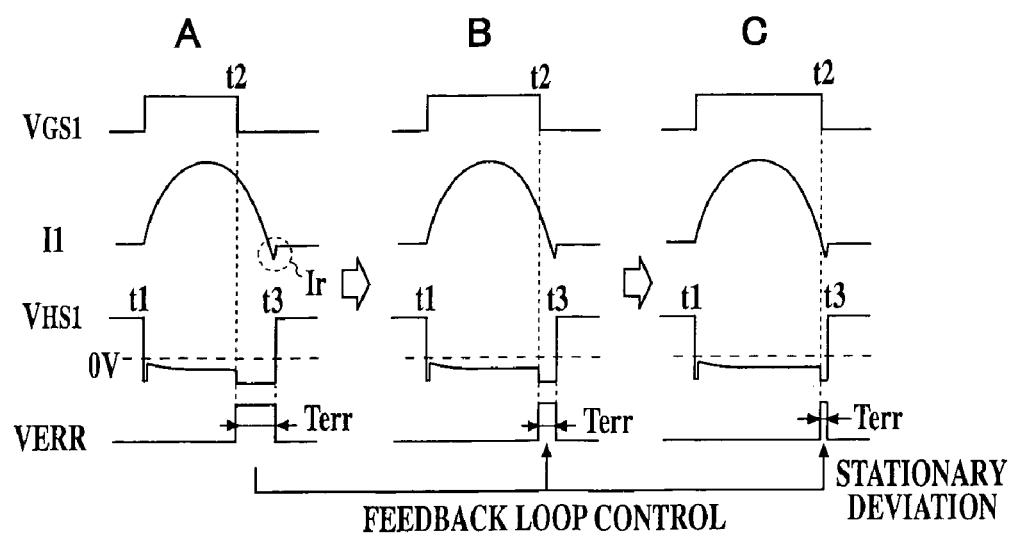
FIG. 2 is a time chart showing an example of normal operation of the DC converter of the embodiment.

FIG. 2 shows variation of current I1 (or I2) flowing through the coil L1 of the secondary coils L1 and L2 of the transformer 20, variation of voltage VGS1 (or VGS2) applied to the gate terminal of the switching MOSFET SW1 connected to this coil, variation of drain side voltage VGS1 (or VHS2) of the SW1, and variation of voltage VERR produced in the on/off signal producing circuit 34. The current I2 flowing to the coil L2, gate voltage VGS2 of the SW2, and drain side voltage VHS2 of the SW2 have phases which are different from those of the I1, VGS1 and VHS1 by 180° but they have the same waveforms and thus, illustration thereof is omitted.

The control circuit 30 of the embodiment detects timing using characteristics of the body diodes Ds1 and Ds2 of the switching MOSFET SW1 and SW2. More specifically, as shown in FIG. 2, if the switching MOSFET SW1 is off before current I1 starts flowing to the coil L1, current I1 flows through the body diode Ds1 and with this, the drain side voltage VHS1 abruptly falls (timing t1). The first timing detection circuit 31 monitors the VHS1, thereby detecting the timing t1 at which the forward current starts flowing to the body diode Ds1. The on/off signal producing circuit 34 raises gate voltage VGS1 by the detection signal.

After the current I1 flowing to the coil L1 is reduced and reaches zero, temporary restoring current Ir flows toward the body diode Ds1, current flows toward the negative side by the restoring current and then, the body diode is turned off. Since the transformer 20 supplies the restoring current Ir, drain voltage VHS1 of the switching MOSFET SW1 rises by the counter electromotive force generated by the magnet flux and leakage flux of the secondary coil L1 at this instant (timing t3). The third timing detection circuit 33 monitors VHS1. With this, the timing t3 is detected by the counter electromotive voltage generated by the secondary magnet flux and leakage flux of the transformer at the instant when the body diodes Ds1 and Ds2 are turned off.

The on/off signal producing circuit 34 lowers the gate voltage VGS1 before the counter electromotive voltage is generated by the secondary magnet flux and leakage flux of the transformer at the instant when the body diodes Ds1 and Ds2 are turned off, and detects time (called error amount in this specification) Terr required from the VGS1 falling timing t2 to detection timing t3 of the counter electromotive voltage, and sets a feedback loop such that the error amount terr is reduced at the next switching time like in FIG. 2, steps (A)→(B)→(C). In FIG. 2, in step (B), the pulse width of Terr is reduced as compared with step (A), and off timing of SW1 approaches the optimal state. Finally, the state is brought into a stationary state having a stationary deviation (step (C)). With this, the switching MOSFET SW1 can be turned on for a period during which current I1 tries to flow to the secondary coil in a predetermined direction, and the SW1 can be turned off when the current is about zero. Therefore, time during which current flows through the body diode of SW1 can be shortened and the loss can be reduced.

Figure 3:
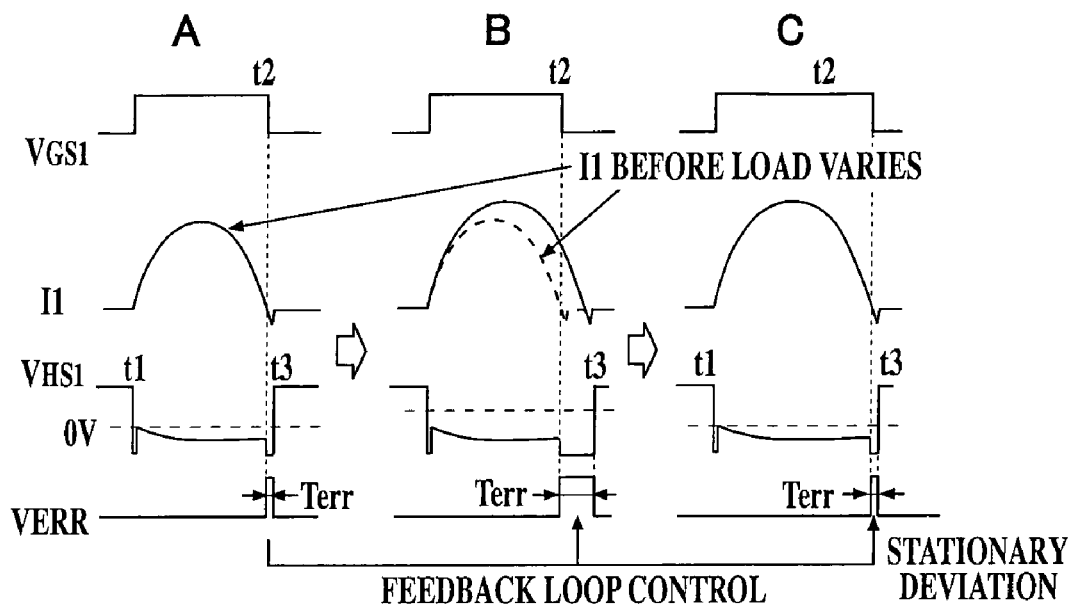
FIG. 3 and 4 are time charts showing examples of operation when a load of the DC converter of the embodiment is varied.

In this embodiment, a case in which a load is abruptly varied can be handled. More specifically, when the period of current I1 becomes long due to variation in load as shown in steps (A)→(B) in FIG. 3, the error amount Terr in FIG. 3 is increased (step (B)). At the time of the next switching operation, the feedback loop is set such that the error amount Terr is reduced. Finally, the state is brought into the stationary state having the stationary deviation (step (C)).

Figure 4:
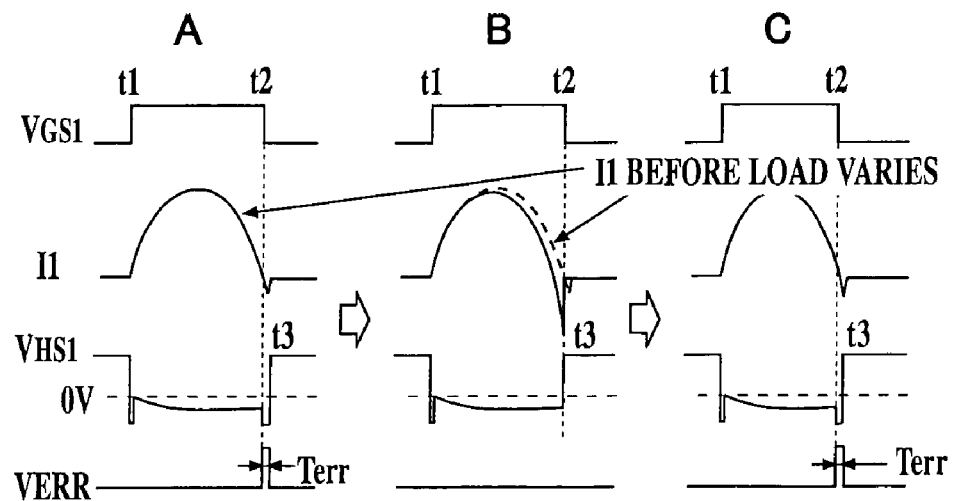

On the other hand, when the period of current I1 becomes short due to variation in the load as shown in steps (A)→(B) in FIG. 4, the drain side voltage VHS1 of the SW1 rises at the instant when the VGS1 falls, and the error amount Terr becomes zero. In this case, the falling timing t2 of VGS1 is set at timing before zero current as shown in step (C) in FIG. 3. With this, the error amount Terr is again detected, and the state is returned to the stationary control state.

Figure 5:
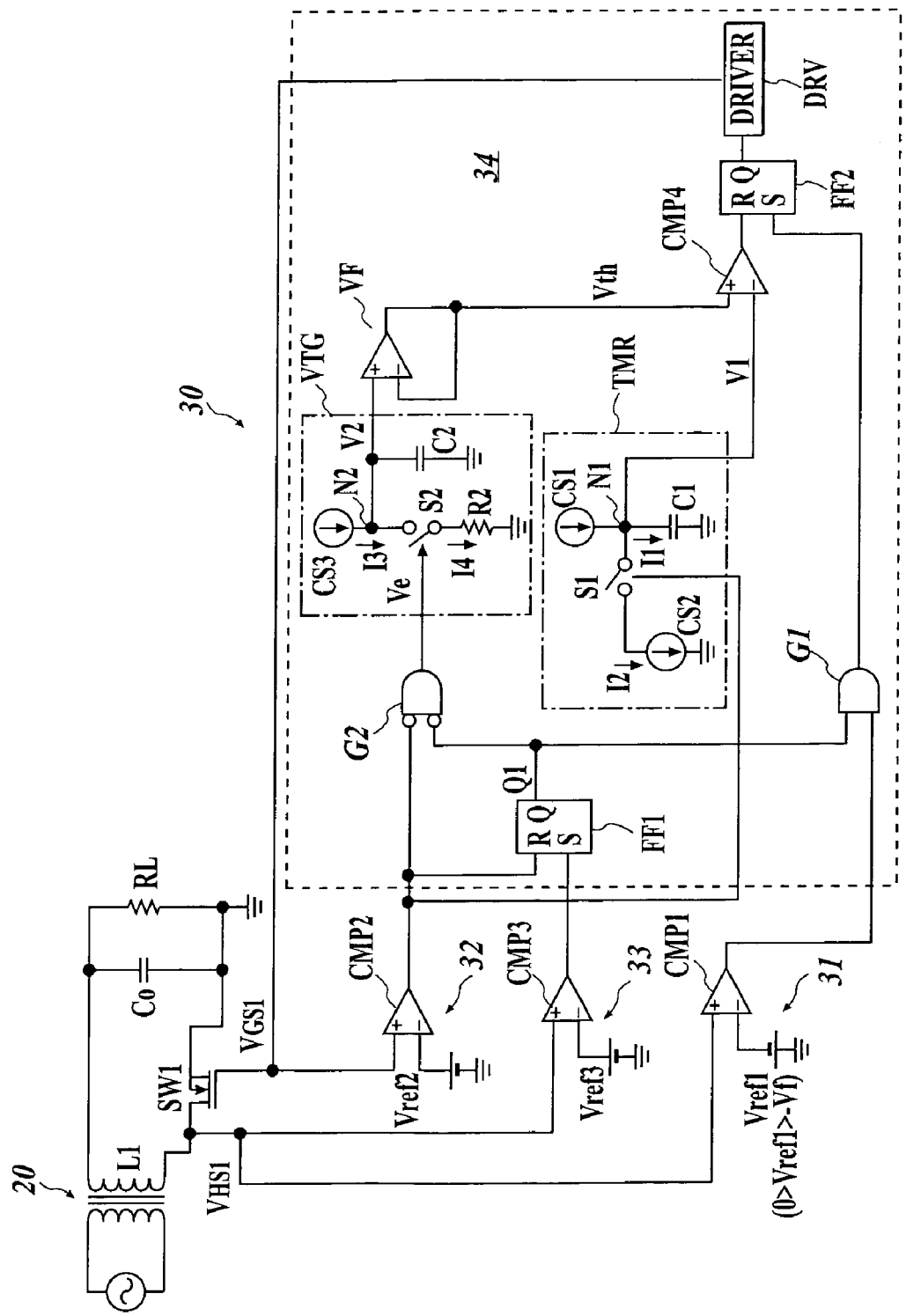
FIG. 5 is a circuit diagram showing a concrete circuit example of a synchronous rectification circuit of the DC converter of the embodiment.

FIG. 5 shows an example of a more specific circuit configuration of the control circuit 30 of the embodiment. In FIG. 5 also, only the coil L1 of the secondary coils L1 and L2 of the transformer 20 and the switching MOSFET SW1 connected to the coil L1 are shown, and illustration of the other coil L2 and the switching MOSFET SW2 is omitted.

As shown in FIG. 5, first to third timing detection circuits 31 to 33 comprise comparators CMP1 to CMP3, respectively. The comparator CMP1 of the first timing detection circuit 31 compares the drain side voltage VHS1 of the switching MOSFET SW1 and the reference voltage Vref1 with each other, thereby detecting the timing t1 at which forward current starts flowing to the body diode Ds1. The forward voltage of the body diode Ds1 is defined as Vf. If the reference voltage Vref1 is set in a range of 0>Vref1>−Vf, it is possible to detect the timing t1 at which the forward current starts flowing.

The second timing detection circuit 32 compares voltage VGS1 applied to the gate terminal of the switching MOSFET SW1 and the reference voltage Vref3, thereby detecting the timing t2 at which the VGS1 falls. If the reference voltage Vref3 is set in a range of 0<Vref2<VGS1, it is possible to detect the timing t2 at which the VGS1 falls.

According to the third timing detection circuit 33, the drain side voltage VHS1 of the switching MOSFET SW1 is input, and the third timing detection circuit 33 detects a rising edge of the counter electromotive voltage generated by the secondary magnet flux and leakage flux of the transformer at the instant when the body diode Ds1 is turned off, and compares the rising edge and the reference voltage Vref3 with each other, and can detect the VHS1 rising timing t3.

The on/off signal producing circuit 34 includes an RS flip-flop FF1 in which an output signal of the second timing detection circuit 32 is a reset signal and an output signal of the third timing detection circuit 33 is a set signal, an AND gate G1 in which output of the flip-flop FF1 and an output signal of the first timing detection circuit 31 are input, and a NOR gate G2 in which output of the flip-flop FF1 and an output signal of the second timing detection circuit 32 are input.

The on/off signal producing circuit 34 includes a timer circuit TMR in which an output signal of the second timing detection circuit 32 is an actuation signal, a variable threshold value producing circuit VTG in which an output signal of the NOR gate G2 is a control signal, a comparator CMP4 which compares output of the timer circuit TMR and output of the variable threshold value producing circuit VTG with each other, an RS flip-flop FF2 in which an output signal of the comparator CMP4 is a reset signal and an output signal of the AND gate G1 is a set signal, and a drive circuit (driver) DRV which produces a gate control voltage VGS1 of the synchronous rectification switching MOSFET SW1 from output of the flip-flop FF2.

The timer circuit TMR is an analogue timer including a charge/discharge capacitor C1, a constant current source CS1 for charging the charge/discharge capacitor C1, and serial switch S1 and constant current source CS2 for gradually reducing electric charge of the capacitor C1. The timer circuit TMR is designed such that the current I1 of the constant current source CS1 is smaller than the current I2 of the constant current source CS2. With this, the charged electric charge of the capacitor C1 which was charged by the constant current source CS1 for a period during which the switch S1 is off is pulled out by difference current of I2-I1 for a period during which the switch S1 is on. With this, sawtooth shaped voltage V1 which is lowered at predetermined speed is output.

The variable threshold value producing circuit VTG includes a charge/discharge capacitor C2, a constant current source CS3 for charging the capacitor C2, serial switch S2 and resistor R2 for gradually reducing charged electric charge of the capacitor C2, and a voltage follower VF which impedance-converts potential of the capacitor C2 and outputs the same. The variable threshold value producing circuit VTG is designed such that current I3 of the constant current source CS3 is smaller than current I4 of the resistor R2. With this, the charged electric charge of the capacitor C2 which was charged by the constant current source CS3 for a period during which the switch S2 is off is pulled out by current of I4-I3 for a period during which the switch S2 is on. With this, time during which the switch S2 is on, i.e., voltage V2 corresponding to the pulse width of the control signal of the switch S2 is output.

Next, the operation of the control circuit 30 shown in FIG. 5 will be explained using a time chart shown in FIG. 6.

Figure 6:
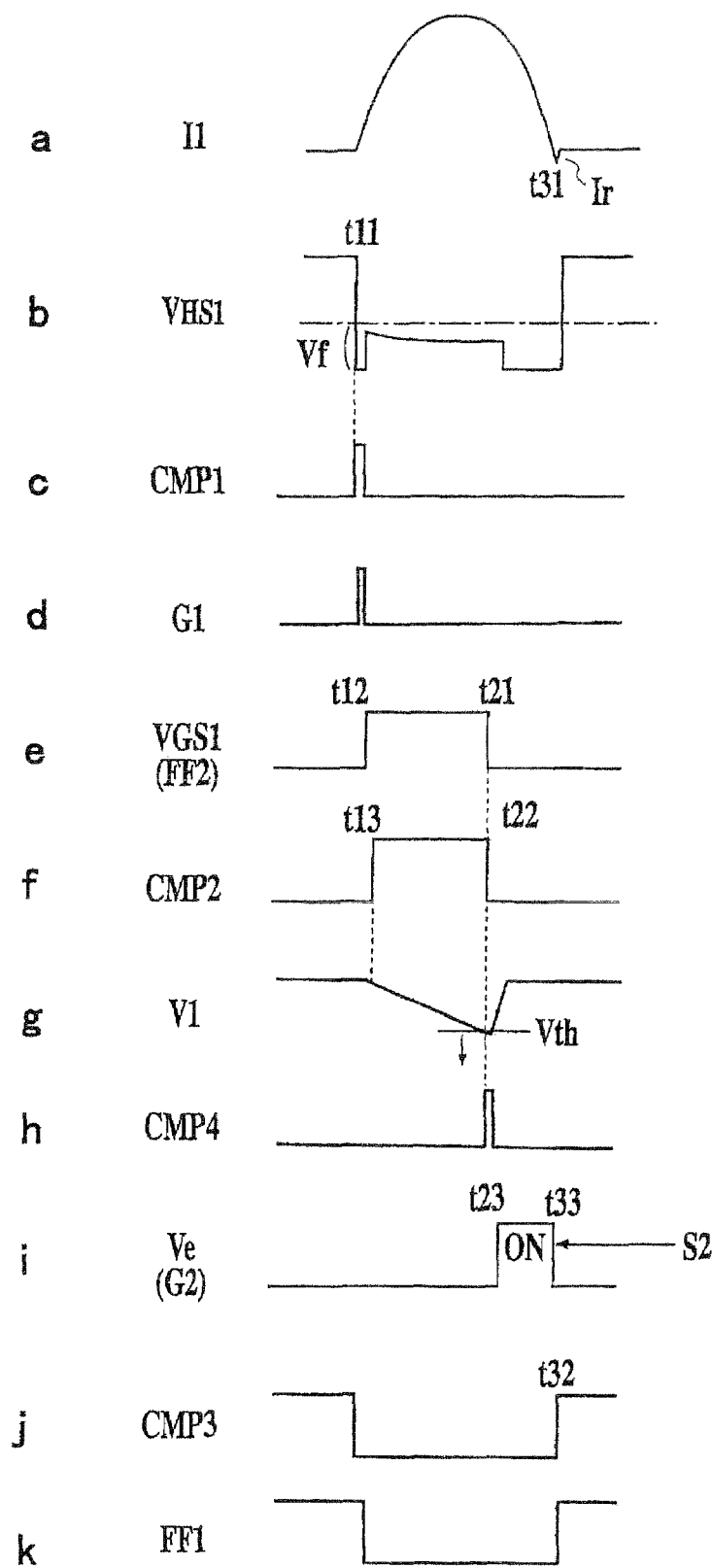
FIG. 6 is a time chart showing an example of operation of the synchronous rectification circuit shown in FIG. 4.
Figure 7:
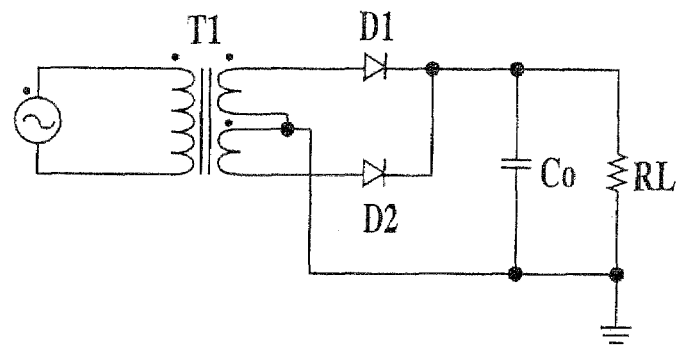
FIG. 7 is a circuit diagram showing one example of a conventional half bridge type DC converter.
Figure 8:
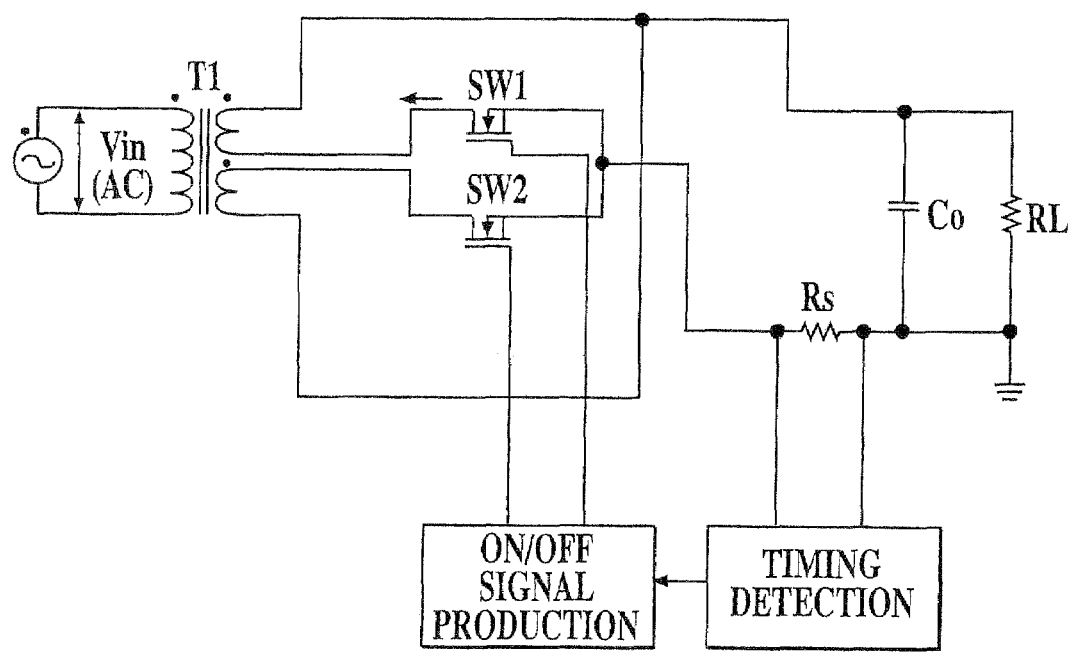
FIG. 8 is a circuit diagram showing another example of a conventional half bridge type DC converter.

The current I1 is varied as shown in FIG. 6(a) in the coil L1 in accordance with variation of the AC voltage Vin (AC). When the current I1 starts flowing to the coil L1, the switching MOSFET SW1 is off. Therefore, the current I1 flows through the body diode Ds1, and the drain side voltage VHS1 of the SW1 abruptly falls as shown in FIG. 6 step (b) (timing t11).

Then, the comparator CMP1 of the first timing detection circuit 31 in which VHS1 is input detects this state, and the output is changed to high level (FIG. 6, step (c)). Since output of the flip-flop FF1 is initially at high level, output of the AND gate G1 is changed to high level as shown in FIG. 6, step (d), the flip-flop FF2 is set, and the gate control voltage VGS1 which is output of the driver DRV rises as shown in FIG. 6, step (e) (timing t12).

Then, the comparator CMP2 of the second timing detection circuit 32 detects the rising of the gate control voltage VGS1. With this, output thereof is changed to high level (timing t13). Then, the switch S1 in the timer circuit TMR is turned on, and potential V1 of a node N1 gradually starts falling as shown in FIG. 6, step (g). When the potential V1 reaches a threshold value voltage Vth which is output from the variable threshold value producing circuit VTG, the output of the comparator CMP4 is changed to high level as shown in FIG. 6, step (h), the flip-flop FF2 is reset, and the gate control voltage VGS1 which is output of the driver DRV falls (timing t21). The threshold value voltage Vth which is output from the variable threshold value producing circuit VTG is initially set relatively high. Thus, the timing t21 at which the gate control voltage VGS1 falls is before the timing t31 at which the current I1 flowing to the coil L1 becomes zero.

Next, the comparator CMP2 of the second timing detection circuit 32 detects the falling of the gate control voltage VGS1 and with this, output thereof is changed to low level as shown in FIG. 6, step (f) (timing t22). Since the output of the flip-flop FF1 is set to the low level, output Ve of the NOR gate G2 rises as shown in FIG. 6, step (i), and the switch S2 in the variable threshold value producing circuit VTG is turned on (timing t23). With this, the potential V2 of a node N2 of the variable threshold value producing circuit VTG starts falling.

A potential falling amount at that time depends on a period during which the output Ve of the NOR gate G2 stays at high level. That is, as the high level period of Ve is longer, the potential V2 is lower. The potential V2 is supplied to the comparator CMP4 as the threshold value voltage Vth by the voltage follower VF. At a next cycle, the comparator CMP4 compares the potential V1 of the node N1 in the timer circuit TMR and the threshold value voltage Vth, and if the V1 reaches the threshold value voltage Vth, The output is changed to the high level and the flip-flop FF2 is reset. Therefore, as the threshold value voltage Vth becomes lower, the timing t21 at which the gate control voltage VGS1 which is output of the driver DRV approaches zero.

After the current I1 flowing to the coil L1 is reduced and reaches zero, the restoring current Ir flows toward the body diode Ds1 for a moment (timing t31). Since the restoring current is supplied from the transformer, counter electromotive voltage is generated by the secondary magnet flux and leakage flux of the transformer at the instant when the body diode is turned off. The comparator CMP3 of the third timing detection circuit 33 monitors VHS1, detects the rising edge of the counter electromotive voltage generated by the secondary magnet flux and leakage flux of the transformer at the instant when the body diode Ds1 is turned off, and the output thereof is changed to the high level as shown in FIG. 6, step (j) (timing t32). With this, the output of the flip-flop FF1 is changed to the high level, and the output Ve of the NOR gate G2 is changed to the low level (timing t33).

With the above-described operation, the error amount Terr shown in FIG. 2 can be reduced, and when the current I1 flowing to the switching MOSFET SW1 is around zero current, the SW1 can be turned off. Therefore, time during which current flows through the body diode can be shortened, and the loss can be reduced.

In this embodiment, when the cycle of the current I1 becomes short due to variation in load as shown in FIG. 4, steps (A)→(B), if the drain side voltage VHS1 of the SW1 rises at the instant when the VGS1 rises, the output Ve of the NOR gate G2 is not changed to the high level. Therefore, electricity is not discharged to the capacitor C2 in the variable threshold value producing circuit VTG, and the threshold value voltage Vth supplied to the comparator CMP4 at the next cycle becomes high. As a result, the rising timing t2 of VGS1 is before the zero current as shown in FIG. 4, step (C) and with this, the state is swiftly returned to the stationary control state.

Although the embodiment of the invention has been described above, the invention is not limited to the embodiment, and various modifications can be made based on the technical idea of the invention, and the invention covers those modifications of course. Although AC voltage is input to the primary coil L0 of the transformer 20 in the embodiment, a rectifier circuit comprising a diode bridge circuit may be provided, and when a pulsating flow obtained by rectifying AC voltage is input, DC voltage is input and current flowing to the primary coil may be on/off by the switching element of course.

In the full wave synchronous rectification circuit of the embodiment, the transformer 20 is provided at its secondary side with the two coils L1 and L2, and the switching MOSFET SW1 and SW2 corresponding to the respective coils are provided. The present invention can also be applied to a half wave synchronous rectification circuit having one secondary coil. The invention can also be applied to a flyback type or a resonance type switching power supply apparatus.

Although the invention is applied to the DC-DC converter in the above description, the invention is not limited to this, and the invention cal also be applied to the AC-DC converter.

According to the above-mentioned preferred embodiments, there is provided a synchronous rectification type switching power supply apparatus including a transformer to receive input voltage on a primary side, and a rectifier circuit using a switching MOSFET on a secondary side of the transformer, wherein after first timing at which forward current flows to a body diode which is a parasitic diode of the switching MOSFET, second timing at which the switching MOSFET is turned off, and current flows toward a negative side by an amount of restoring current of a body diode, and then the body diode is turned off. Since the restoring current is supplied from the transformer, a control circuit is constituted such that third timing is detected by counter electromotive voltage which is generated by secondary magnet flux and leakage flux of the transformer at the instant when the body diode is turned off, the switching MOSFET is turned on at the first timing, the switching MOSFET is turned off before the third timing, and an off control signal of the switching MOSFET is produced such that off timing of the switching MOSFET is brought close to the third timing.

According to the synchronous rectification type switching power supply apparatus having the synchronous control circuit of the above structure, the switching MOSFET can be turned on during a period during which current in a predetermined direction tries to flow to a secondary coil by voltage variation of a primary coil of the transformer, and the switch can be turned off when current flowing through the switching MOSFET is about zero. Therefore, time during which current flows through the body diode can be shortened and the loss can be reduced.

Since it is unnecessary to detect reduction in voltage caused by resistance component (usually a few mΩ) of the MOSFET having small on resistance to produce the on/off control signal, stable synchronous rectification control can be carried out without requiring a precise and complicated detection circuit. It is possible to detect timing for producing an on/off control signal of the switching MOSFET without adding a part such as a resistor.

Each of the above timing is detected based on gate voltage of the switching MOSFET and potential of a connection point between the switching MOSFET and the secondary coil of the transformer. With this, since on/off control of the switching MOSFET becomes control by means of feedback loop, it is only necessary to taken only the loop characteristics into consideration, and even if characteristics of elements or parts constituting the control circuit are varied, it is possible to stably control irrespective of the variation.

The feedback loop makes a correction including delay of a switch driving driver and the control circuit by reading out and detecting potential of connection between the switching MOSFET and the secondary coil of the transformer and the gate voltage of the switching MOSFET. Therefore, it becomes unnecessary to design while previously taking the delay from the timing detection circuit to the on/off control signal of the switching MOSFET into consideration.

The entire disclosure of Japanese Patent Application No. 2006-052388 filed on Feb. 28, 2006 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A synchronous rectification type switching power supply apparatus, comprising:
   a transformer to receive input voltage on a primary side;
   a switching element that is to be turned on or off for rectifying current of a secondary coil of the transformer;
   a control circuit to drive the switching element, the control circuit including a first timing detection circuit to detect first timing at which forward current flows through a body diode of the switching element, and a second timing detection circuit to detect second timing with counter electromotive voltage that is generated at an instant when the body diode is turned off, wherein
   the control unit is to generate an on/off control signal for the switching element to turn on the switching element at the first timing, to turn off the switching element before the second timing and to bring off-timing of the switching element close to the second timing.

2. A switching power supply apparatus according to claim 1, wherein
   the first timing and the second timing are detected by the first timing detection circuit and the second timing detection circuit based on a potential on a connection side between the switching element and a secondary coil of the transformer.

3. A switching power supply apparatus according to claim 1, further comprising:
   a third timing detection circuit that is to detect variation timing of the on/off control signal for the switching element.

4. A switching power supply apparatus according to claim 3, wherein
   the control circuit further includes:
   a timer circuit that is to be actuated by a detection signal of the third timing detection circuit and to output voltage varying at a constant speed;
   a threshold voltage generating circuit that is to generate a predetermined threshold voltage; and
   a comparator that is to compare the threshold and the output voltage of the timer circuit, wherein
   the threshold voltage generating circuit is to vary the threshold in accordance with time difference between the second timing and the third timing.

5. A switching power supply apparatus according to claim 1, further comprising:
   a first coil and a second coil disposed on a secondary side of the transformer;
   a first synchronous rectification switching element connected to the first coil; and
   a second synchronous rectification switching element connected to the second coil, wherein
   the control circuit is to turn on the first synchronous rectification switching element and the second synchronous rectification switching element during a phase period during which phases of both the switching elements are different from each other by substantially 180°.

6. A switching power supply apparatus according to claim 1, wherein voltage that is to be input to the primary side of the transformer is AC voltage or of a rectangular wave.

* * * * *